(12) United States Patent
Kurtin

(10) Patent No.: US 6,893,124 B1
(45) Date of Patent: May 17, 2005

(54) TYPE OF MAGNETICALLY ATTACHED AUXILIARY LENS FOR SPECTACLES

(75) Inventor: Stephen Kurtin, Sherman Oaks, CA (US)

(73) Assignee: Sunbird, LLC, Sherman Oaks, CA (US)

(*) Notice: Subject to any disclaimer, the term of this patent is extended or adjusted under 35 U.S.C. 154(b) by 0 days.

(21) Appl. No.: 10/779,198

(22) Filed: Feb. 13, 2004

(51) Int. Cl.⁷ .................................................. G02C 7/08
(52) U.S. Cl. ............................................ 351/57; 351/47
(58) Field of Search ............................. 351/47, 48, 57, 351/58

(56) References Cited

U.S. PATENT DOCUMENTS

| | | | |
|---|---|---|---|
| 4,070,103 A | 1/1978 | Meeker | 351/52 |
| 5,416,537 A | 5/1995 | Sadler | 351/57 |
| 5,642,177 A | 6/1997 | Nishioka | 351/47 |
| 5,982,036 A * | 11/1999 | Uchibori et al. | 257/757 |
| 6,116,730 A | 9/2000 | Kwok | 351/47 |
| 6,149,269 A | 11/2000 | Madison | 351/47 |
| 6,164,774 A | 12/2000 | Cate | 351/47 |
| RE37,545 E | 2/2002 | Chao | 351/57 |
| 6,343,858 B1 | 2/2002 | Zelman | 351/47 |
| 6,412,942 B1 | 7/2002 | McKenna et al. | 351/47 |
| 6,783,238 B1 * | 8/2004 | Stepper | 351/178 |

* cited by examiner

*Primary Examiner*—Huy Mai
(74) *Attorney, Agent, or Firm*—Saul Epstein

(57) ABSTRACT

A magnetically affixed attachment for spectacles, including a preferably non-magnetic eyewire having front and rear regions. An auxiliary ens is held in the front region, and the rear region contains a plurality of micromagnets. Each micromagnet, preferably of the rare earth type, is located on the inner periphery of the rear region, and is thereby protected from physical abuse. The inner periphery of said eyewire has the same shape, but preferably is slightly larger than the outer periphery of the spectacle rim to which it is intended to attach, hence allowing maximum contact between each micromagnet and the spectacle rim, which rim is fabricated of, or includes, magnetic material.

44 Claims, 3 Drawing Sheets

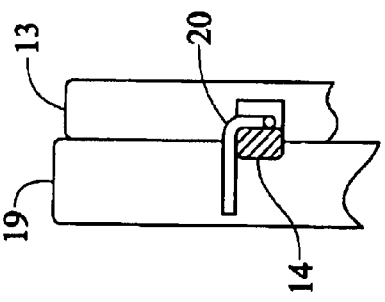
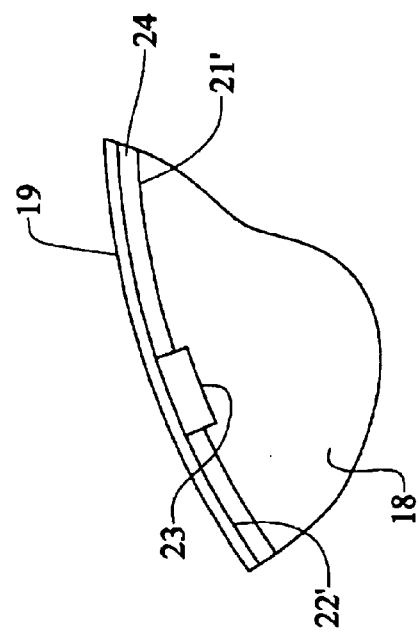
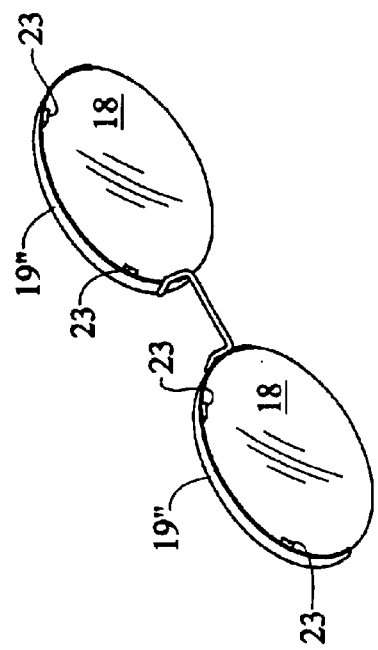
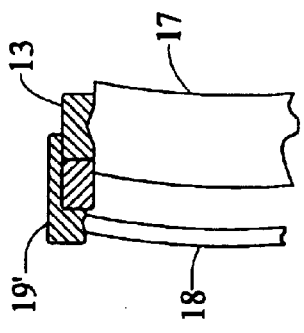
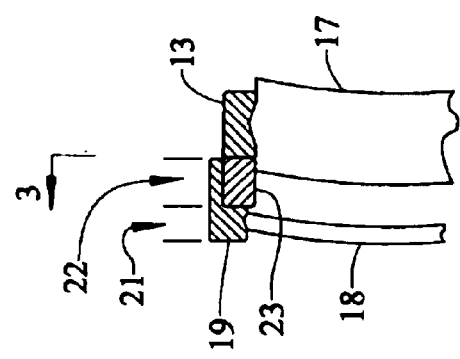
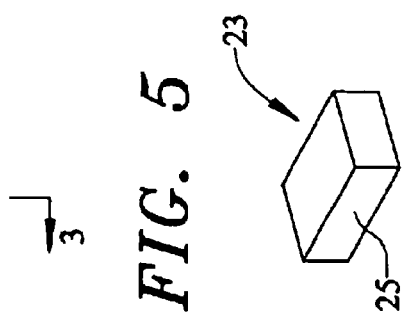

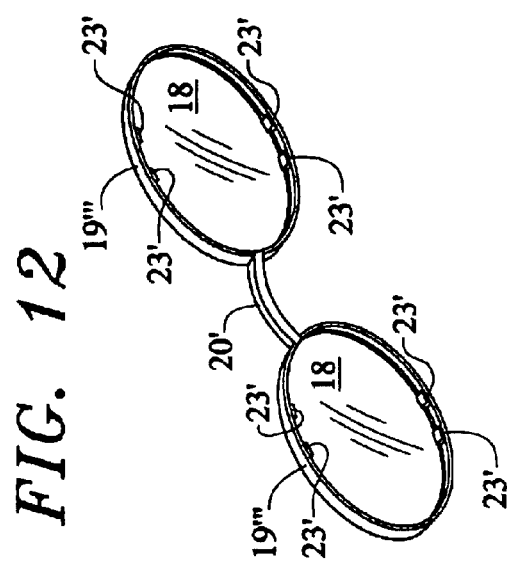
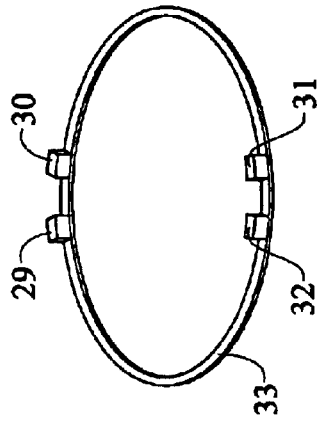
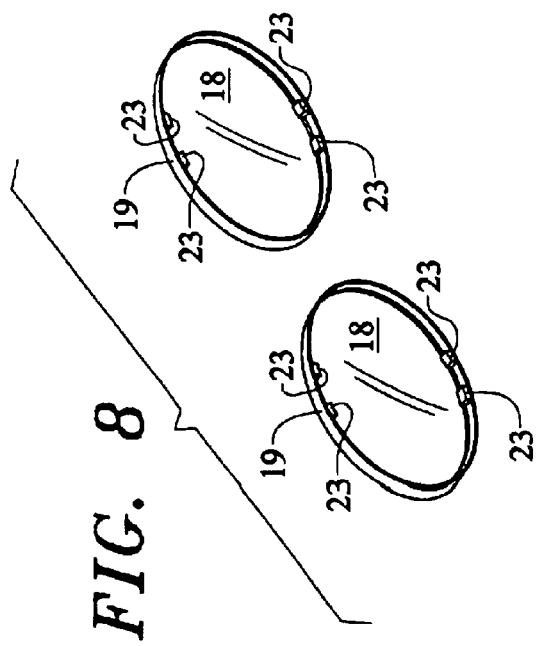
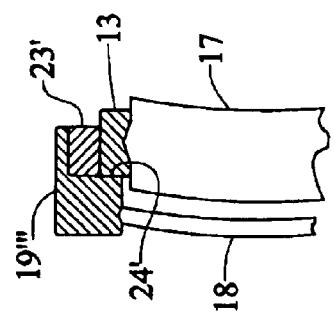
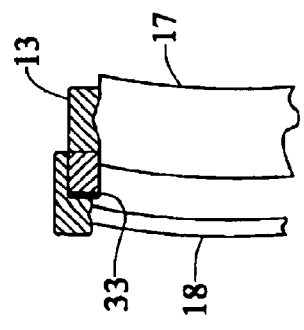

TYPE OF MAGNETICALLY ATTACHED AUXILIARY LENS FOR SPECTACLES

BACKGROUND OF THE INVENTION

Many people are uncomfortable in bright sunlight without sunglasses. Since prescription spectacles are relatively expensive, it has become common to provide tinted "clip-on" auxiliary lenses to enable the use of one pair of prescription spectacles indoors and out. Initially such "clip-ons" were mechanically attached to the parent spectacles as by hooks or other mechanical means, but recently magnetic attachment has become popular. Examples of magnetic attachment schemes can be found in many prior art patents.

A first group of prior art patents is exemplified by Chao, U.S. Pat. No. RE37,545, Madison, U.S. Pat. No. 6,149,269, Zelman, U.S. Pat. No. 6,343,858, Kwok, U.S. Pat. No. 6,116,730 Nishioka, U.S. Pat. No. 5,642,177 and Cate, U.S. Pat. No. 6,164,774. This first group is characterized by an auxiliary lens attachment having a construction very much like that of the spectacles to which it attaches, but instead of having temples, the attachment has a pair of magnet-containing-arms, each magnet mating with a corresponding magnet affixed to one of the endpieces of the parent spectacles. Depending on the patent, the magnets are disclosed as facing in some particular direction, e.g. upward, downward, forward, rearward or outward.

A second group of patents is represented by Sadler, U.S. Pat. No. 5,416,537. Instead of locating magnets on external arms, Sadler's style of attachment involves embedding magnets in the temporal portions of the auxiliary lens structure itself. These embedded magnets face rearward, and mate with corresponding magnets embedded in the parent spectacle frame.

A third prior art group is illustrated by Starner et al., U.S. Patent Application Publication No. 2002/0089639. The Starner disclosure describes a plurality of small magnets attached to each auxiliary lens near its periphery. Each attached magnet mates with a corresponding magnet attached to the frame of the parent spectacles.

Finally, a fourth group is represented by Meeker, U.S. Pat. No. 4,070,103 and McKenna et al., U.S. Pat. No. 6,412,942. These patents teach the use of continuous magnetic bands. In Meeker, a continuous magnetic band surrounds the spectacle rim. In McKenna et al. the eyewire of each auxiliary lens is fabricated from a spinodal decomposition alloy which, when heat treated, becomes a permanent magnet that is attracted to the magnetically permeable rim of the parent spectacles.

SUMMARY OF THE INVENTION

While the present invention is said to relate to auxiliary lenses, that term may be slightly misleading in that the "lenses" used generally have no optical power. The primary use of the present invention is expected to be as a sunglass attachment to block undesired wavelengths of light or simply to reduce intensity. For some uses, however, the invention may include magnifying lenses as, for example, when used as an attachment that provides a "reading ADD" to spectacles bearing the user's distance prescription It will, of course, be appreciated that there are also other uses for the invention.

For convenience and consistency, as used in this specification and in the appended claims, the direction away from a wearer's eyes will be referred to as forward, and that toward a wearer's eyes will be referred to as rearward. Accordingly, the most forward and rearward locations will be called the front and the rear (or back), respectively. Also, even though portions of the invention may be discussed apart from a complete assembly in use, directional information will be given as if the invention was in place on a person's face. The term "radial" is used to refer to a direction substantially parallel to the plane of the lens and perpendicular to the rim at any point.

The present invention is particularly adapted, but not limited, to so-called "wire-rim" type spectacles. The term "wire-rim", as the name suggests, refers to spectacles having wire-like metallic rims, such a rim also being called an "eyewire". While each eyewire usually has a substantially uniform cross section, local depressions (and other minor deviations from uniformity) may be present. Most commonly, eyewires are fabricated from metallic wire which has been rolled and/or drawn to achieve a desired cross sectional shape (a 'profile'). After the profile is produced, it is bent to form a peripheral shape suitable for holding a lens. That is, the eyewire, or rim, is formed. A 'closure block' is often used to clamp the two ends of each eyewire together, and thereby securely hold a lens. Alternatively, the ends of the eyewires can be brazed together, and a lens snapped into a groove on the inner periphery of the resulting closed periphery. For clarity, closure blocks are not included in the drawings appended to this specification.

For best results, the eyewires of the parent spectacles used in connection with the invention should be ferromagnetic; for example, fabricated from a magnetic 400 series stainless steel. A bridge is attached to each of two such eyewires to hold them in spaced relationship so as to permit the spectacles to be placed on a user's nose (often via nose pads) with a lens in front of each eye. An endpiece connects the outer portion of each eyewire to an associated temple to complete the spectacles.

The rims of the invented auxiliary lens attachment are preferably fabricated in generally the same manner as described above for the parent spectacles, and hence can be said to be of the wire-rim type. The auxiliary lens attachment can take the form of two "single lens" attachments, or of a single "two lens" attachment. In the former case, two separate auxiliary lenses are individually attachable to the two lenses of a pair of parent spectacles. In the latter case, an assembly of two auxiliary lenses, held together by a bridge, is attachable as a unit to the parent spectacles.

The eyewires of either kind of attachment are preferably fabricated from non-magnetic material; for example, nickel-silver. As noted in connection with the parent spectacles, closure blocks can be used to fasten the two ends of each eyewire and clamp the auxiliary lens, or the respective ends can be brazed together and the auxiliary lens snapped in.

In accordance with the invention, the rim of each auxiliary lens is comprised of two regions. The first region, which is the front region, includes means for holding a lens. For example a circumferential lip on the lens can mate with a groove in the inner periphery of the front region of the rim. The second region, at the rear of the rim, contains a plurality of discrete permanent micromagnets attached to its inner periphery. When an auxiliary lens is in place against parent spectacles, each of said micromagnets tends to keep that auxiliary lens affixed by virtue of magnetic attraction to the magnetically permeable (e.g., ferromagnetic) rims of the spectacles.

The present invention has distinctive advantages over each of the four groups of prior art mentioned above. In brief, these advantages are as follows:

As compared to the first group, the present invention does not have arms projecting from the attachment, which arms can easily be bent and/or broken while the attachment is being carried in a users' pocket or purse, nor does it require an alignment of the arms to achieve magnetic latching.

As compared to the second group, the present invention does not require protuberances at the temples. Such protuberances are inherently esthetically unpleasing, must typically be rather large to function properly, and seriously limit the cosmetic design versatility of the attachment.

As compared to the third group, the present invention does not include exposed magnets which are susceptible to being broken off. In the present invention, the micromagnets are placed so as to be protected from incidental and handling-induced damage.

A significant advantage of the present invention over all three of groups 1–3 prior art is that the present invention does not require that the magnets of the auxiliary lens attachment be aligned with other magnets on the parent spectacles. Accordingly, the present invention is easier to attach to the parent spectacles, particularly when the spectacles are being worn.

As compared to the fourth group of prior art patents, the present invention does not involve the use of a magnetic band. By virtue of utilizing a magnetic band, group four prior art is inherently limited to the use of ductile permanent magnet materials. All currently known ductile materials have relatively low volumetric efficiencies, which, in this application, results in a low attractive force. On the other hand, the discrete micromagnets used in the present invention need not be ductile, and high volumetric efficiency magnet materials, such as rare earth magnets, may be used. Hence, the present invention overcomes a significant limitation of the prior art.

BRIEF DESCRIPTION OF THE DRAWINGS

FIG. 2 is a fragmentary side sectional view of the first embodiment of the invention mounted on a pair of spectacles taken at the location of 2—2 of FIG. 1.

FIG. 3 is a fragmentary rear view of one of the lens units of the first embodiment of the invention FIG. 4 is a fragmentary side sectional view of the first embodiment of the invention mounted on a pair of spectacles taken at the location of 4—4 of FIG. 1.

FIG. 5 is a trimetric view of a typical micromagnet used in connection with the invention.

FIG. 6 is a fragmentary side sectional view of a variant of the first embodiment of the invention, taken at the section corresponding to 2—2 of FIG. 1.

FIG. 7 is a trimetric view of a second embodiment of the invention.

FIG. 8 is a trimetric view of a third embodiment of the invention.

FIG. 9 is an oblique view of a micromagnet assembly comprising a alternate micromagnet configuration.

FIG. 10 is a view similar to FIG. 2, but with a micromagnet assembly according to FIG. 9 installed.

FIG. 11 is a fragmentary cross sectional view of a fourth embodiment of the invention taken at the section corresponding to 2—2 of FIG. 1.

FIG. 12 is a trimetric view of the fourth embodiment of the invention.

DETAILED DESCRIPTION OF THE INVENTION

Figure 1:
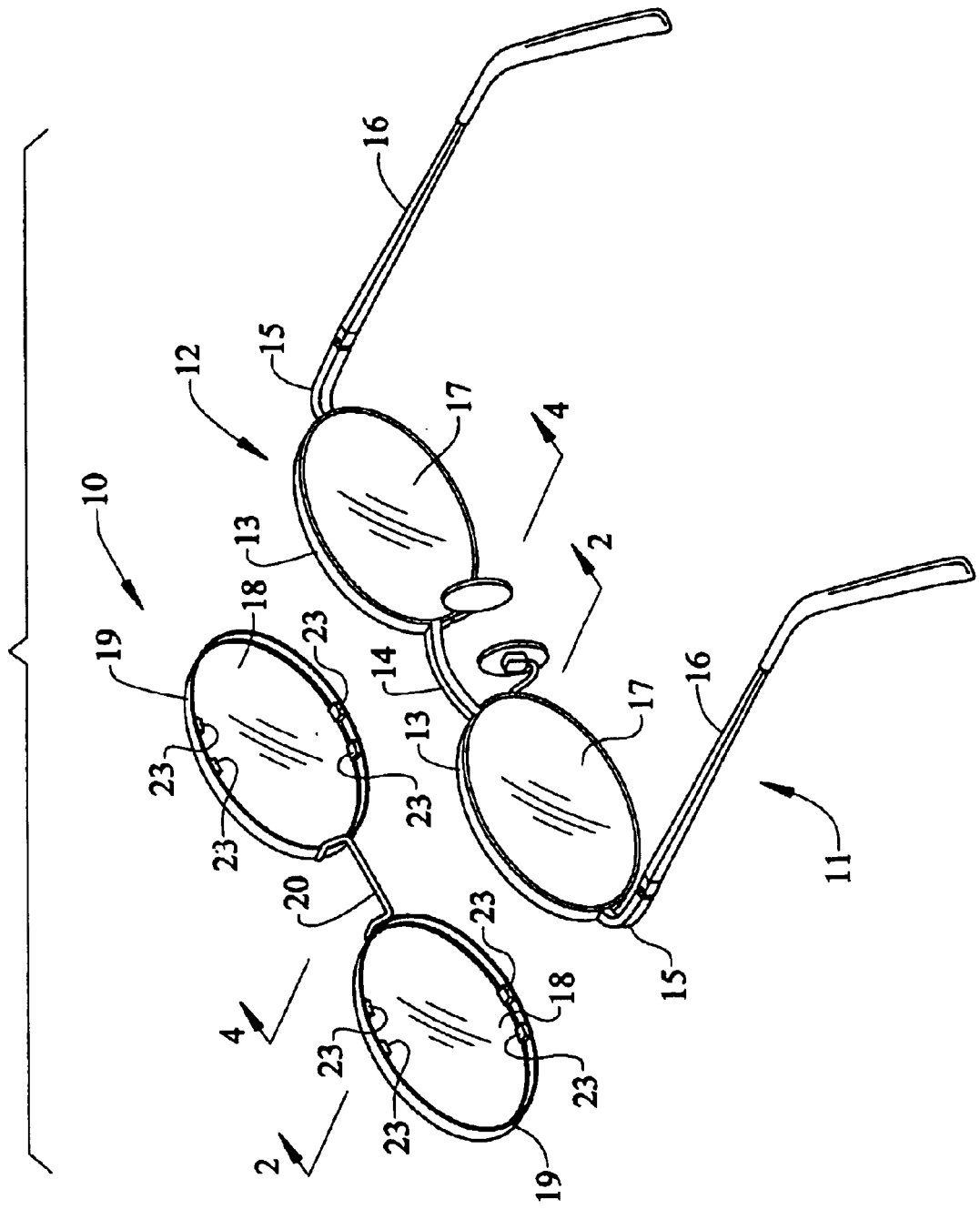
FIG. 1 is a trimetric view of a first embodiment of the invention shown together with a pair of spectacles to which the invented clip-on can be magnetically attached.

FIG. 1 depicts one embodiment of the invented auxiliary lens attachment 10, placed adjacent to a pair of spectacles 11 to which it is, intended to be attached. The spectacles 11 include a frame 12 that is comprised of two rims 13 held in a spaced relationship by a bridge 14. Endpieces 15 project from the outer portions of the rims 13 with temples 16 attached thereto. The rims 13 are fabricated from a magnetic material, preferably ferromagnetic, for example mild steel or a magnetic stainless steel, e.g., type 430 stainless steel. The lenses 17 usually have a prescription to correct the vision of the wearer, and may be single vision, bifocal, trifocal, progressive, or other type of lens.

The lenses 18 of the attachment 10, on the other hand, generally have no magnifying power (but, as mentioned in the Summary section, they may have for some uses). They are most commonly tinted to reduce the intensity of incident light, and/or to filter out undesired wavelengths. The lenses 18 are held in rims 19, which have substantially the same external shape as the rims 13, but are preferably slightly larger. The rims 19 are preferably fabricated from a non-magnetic material, for example, nickel-silver. In the embodiment of the invention depicted in FIG. 1, two lens assemblies (each of which includes a rim 19 and a lens 18) are held together by a bridge 20. The bridge 20, as illustrated, performs a secondary function in addition to holding the lens assemblies in proper position, as will be discussed below. Conventional bridges, or even high mounted brow bars could be used, if desired. The rims are preferably formed of wire that has been rolled to have the desired cross section, and then bent to match the shape of the periphery of the lens, the wire ends being either brazed together or held together by closure blocks.

As can be seen in the cross section of FIG. 2, the rim 19 is comprised of two regions 21 and 22. The first region 21, at the front of the rim, includes an opening 21' (which is best seen in FIG. 3) where the lens 18 is held. The second region 22, at the rear of the rim, includes an opening 22' where a plurality of discrete permanent micromagnets 23 are spaced around the opening, preferably held by an adhesive or suitable solder to the outer periphery of the opening and/or to the shoulder 24 formed at the intersection of the openings 21' and 22'. Any number of magnets may be used (2, 3, 4 or even more) depending on their individual strengths and the total amount of attraction desired.

The opening 22' is preferably substantially the same size and shape as the outside of spectacle rim 13. The faces of the micromagnets 23 can thereby contact the entire thickness of the rim 13. Since the radial thickness of the rim 19 is preferably made about the same as the radial thickness of rim 13 (for cosmetic as well as other reasons), the micromagnets 23 are generally thicker than shoulder 24 is wide, and thereby they may extend beyond the edge of opening 21'. Nonetheless, they are protected from dislodgment by the lens 18.

In some spectacles, the endpieces 15 and/or the bridge 14 are attached to or extend in front of the rim 19, and would interfere with region 22 of rim 19 upon installation. In such cases, a notch is preferably provided in rim 19 to clear the endpieces and/or bridge and permit the magnets 23 to attach to rim 19.

Rare earth magnetic materials are presently preferred for the magnets because of their high energy product. This class of magnets includes samarium-cobalt and neodynium-iron-boron. The micromagnets can be attached to the rims using cyanoacrylate or other adhesive, or by other means. FIG. 5 depicts the preferred direction of magnetic polarization of the micromagnets 23. If face 25 is the face that abuts the spectacle rim 13, then face 25 is preferably a north or south magnetic pole of the magnet. The micromagnets 23 are preferably elongated. That is, the length along the periphery of the rim 19 is greater than the thickness (radially of the rim), or the depth (front to back).

One of the advantages of the present invention as compared with the prior art is that the rims of the attachment can fit closely to the rims of the spectacles, and thereby prevent light from entering the field of view through the gap between the two rims. This factor is important since light entering from between the auxiliary lens and the parent spectacle lens can be distracting.

A variant of the invention as illustrated in FIG. 6 provides even greater shielding against unwanted light. As can be seen in FIG. 6, the lip formed by opening 22' extends over rim 13. This extension may exist over only part of the circumference of rim 13, e.g., the top, or it can completely surround the rim. If present, the lip extension may aid in the alignment of the attachment with the spectacle lenses, and also aid in removal by providing al greater surface area for the finger and thumb to hold onto.

Depending on the amount of attraction provided by the micromagnets, it may be desirable to also include a mechanical restraint to prevent the attachment 10 from being dislodged by a momentary shock. Such a restraint can be provided by having a bridge 20 that can hook over the spectacle bridge 14. Bridge 20, as illustrated in FIGS. 1 and 4, is a bridge of this type. It will be appreciated that other means for providing mechanical restraint are also possible. Also, other forms of bridge could be used, depending on whether a mechanical restraint is desired, and/or cosmetic design considerations.

Another embodiment of the invention is illustrated in FIG. 7. Instead, of rims that completely encircle the lenses 18, FIG. 7 illustrates rims 19" that only partially encircle the lenses. In this construction style, the lenses are retained in the rim opening by a transparent monofilament that is attached to both ends of each eyewire. Each length of monofilament passes under the lens in a groove in the periphery of the lens. Such construction is well known in the spectacle trade, and need not be described further. As illustrated, the micromagnets are spaced in the region where the eyewire exists.

Yet another embodiment of the invention is illustrated in FIG. 8. In this embodiment, instead of having two lenses which are held together by a bridge, the auxiliary lenses are separate items; each auxiliary lens is individually attached and magnetically held to the spectacle rims. The construction of each of the separate lens assemblies may be the same as in an embodiment where the lens assemblies are connected by a bridge.

For various reasons, it may be desired to increase the efficiency of the magnetic circuit so as to achieve a greater attraction with the number and size of the micromagnets selected. FIGS. 9 and 10 illustrate one way of increasing this efficiency, namely by the utilization of a ferromagnetic ring 33. In this case, each micromagnet is magnetized so that one pole face is against ring 33 and the other pole face is against rim 13, and the magnet poling is alternated (i.e., if the magnet face 29 is north, face 30 will be made south, face 31 north, and face 32 south). In that way, when the attachment is installed, the magnetic circuit will be complete through magnetic material, and the flux leakage will be reduced. The ring 33 may be continuous around the rim, as illustrated, or it may consist of one or more sections of a ring, which section(s) may be relatively short. Each section preferably contains two, or some other even number of micromagnets.

Another variant of the invention is illustrated in FIGS. 11 and 12. In this variant, the micromagnets contact the outer surfaces of rims 13, instead of the front faces. The micromagnets 23' are similar to the micromagnets 23 shown in the prior embodiments, except that they are preferably magnetized such that the face abutting the outer periphery of rim 13 is a pole face. The rims 19'" are made such that the shoulder 24' against which the micromagnets are placed is wider than the micromagnets so as to provide a locating face against rim 13.

What as been described are several embodiments of a novel sunglass attachment for spectacles. Various modifications and adaptations of the invention may occur to those skilled in the art. Those modifications and adaptations which fall under the spirit of the following claims are intended to be covered thereby.

I claim:

1. An auxiliary lens attachment for spectacles, said spectacles having a pair of lenses, each having a magnetic rim with a predetermined outside size and shape, and a bridge connecting said rims, which attachment comprises:

a pair of lenses, each having a predetermined peripheral size and shape;

an eyewire at least partially surrounding each of said lenses, said eyewires having front and back faces, said lenses being held adjacent to said front faces, said eyewires extending rearward of the back of said lenses;

two or more discrete permanent magnets positioned adjacent the inner periphery of each of said eyewires and behind said lenses; and an auxiliary bridge holding said eyewires in spaced relationship.

2. An auxiliary lens attachment for spectacles as recited in claim 1 wherein said magnets are elongated and are disposed with their long dimensions oriented substantially along the inner periphery of said eyewires.

3. An auxiliary lens attachment for spectacles as recited in claim 2 wherein said magnets are magnetized such that the faces that abut said magnetic rim are pole faces.

4. An auxiliary lens attachment for spectacles as recited in claim 3 wherein said magnets are attached to a ring of magnetic material disposed between said magnets and said eyewire.

5. An auxiliary lens attachment for spectacles as recited in claim 3 wherein at least two of said magnets are attached to a length of magnetic material disposed between said magnets and said eyewire.

6. An auxiliary lens attachment for spectacles as recited in claim 1 wherein the inner periphery of said eyewires in the region behind said lenses has substantially the same shape as said magnetic rim, but is as large or larger radially than the outside of said magnetic rim.

7. An auxiliary lens attachment for spectacles as recited in claim 6 wherein the inner periphery of said eyewires behind said lenses extends over the outside of said spectacle lens for at least a part of the periphery thereby reducing light leakage.

8. An auxiliary lens attachment for spectacles as recited in claim 1 wherein said auxiliary bridge extends over and hooks behind said bridge.

9. An auxiliary lens attachment for spectacles as recited in claim 1 wherein said spectacles have an endpiece extending forward from each of said rims, and further including a notch in the back face of each of said eyewires at a position corresponding to the location of said endpiece.

10. An auxiliary lens attachment for spectacles as recited in claim 1 wherein said discrete permanent magnets are rectangularly shaped rare earth magnets.

11. An auxiliary lens attachment for spectacles which comprises:
   a lens having a predetermined peripheral size and shape;
   a substantially non-magnetic frame having front and back surfaces, said frame having a first opening extending from said front surface, sized and shaped to receive and hold said lens, and a second opening extending from said back surface, said second opening having substantially the same peripheral shape as said first opening; and
   two or more permanent magnets positioned within said second opening and attached to said frame.

12. An auxiliary lens attachment for spectacles as recited in claim 11 wherein said permanent magnets are elongated, and the long dimensions of said elongated permanent magnets are oriented along the periphery of said second opening.

13. An auxiliary lens attachment for spectacles as recited in claim 11 wherein said magnets are attached to a ring of magnetic material disposed between said magnets and said frame.

14. An auxiliary lens attachment for spectacles as recited in claim 11 wherein at least two of said magnets are attached to a length of magnetic material disposed between said magnets and said frame.

15. An auxiliary lens attachment for spectacles as recited in claim 11 wherein said second opening is larger than said first opening, the intersection between said first and second openings defining a shoulder, the width of said shoulder radially being less than the width of said magnets radially.

16. An auxiliary lens attachment for spectacles as recited in claim 11 wherein said second opening is larger than said first opening, the intersection between said first and second openings defining a shoulder, and further including a ring of magnetically permeable material abutting said shoulder.

17. An auxiliary lens attachment for spectacles as recited in claim 16 wherein said second opening is larger than said first opening, the intersection between said first and second openings defining a shoulder, the width of said shoulder radially being less than the width of said magnets radially.

18. An auxiliary lens attachment for spectacles as recited in claim 16 wherein said second opening is larger than said first opening, the intersection between said first and second openings defining a shoulder, and further including at least part of a ring of magnetically permeable material abutting said shoulder.

19. An auxiliary lens attachment for spectacles as recited in claim 11 wherein said permanent magnets are rectangularly shaped rare earth magnets.

20. An auxiliary lens attachment for spectacles which comprises:
   a lens having a predetermined peripheral size and shape;
   an eyewire at least partially surrounding said lens, said eyewire having front and back faces, said lens being held adjacent said front face, said eyewire extending rearward of the back of said lens;
   two or more discrete permanent magnets positioned adjacent the inner periphery of said eyewire behind said lens.

21. An auxiliary lens attachment for spectacles as recited in claim 20 wherein said permanent magnets are elongated, and the long dimensions of said elongated permanent magnets are oriented along the periphery of said eyewire.

22. An auxiliary lens attachment for spectacles a recited in claim 20 wherein said magnets are attached to a ring of; magnetic material disposed between said magnets and said eyewire.

23. An auxiliary lens attachment for spectacles as recited in claim 20 wherein at least two of said magnets are attached to a length of magnetic material disposed between said magnets and said eyewire.

24. An auxiliary lens attachment for spectacles as recited in claim 20 wherein said discrete permanent magnets are rectangularly shaped rare earth magnets.

25. An eyeglass combination comprising:
   spectacles having a pair of spectacle lenses, each spectacle lens retained by a magnetic eyewire rim extending around the periphery of the spectacle lens and having a predetermined peripheral outside size and shape, a spectacle bridge connecting the magnetic eyewire rims, a pair of endpieces coupled to the outer portions of the magnetic eyewire rims, and a temple member coupled to each endpiece;
   a lens attachment assembly magnetically attached to the spectacles, having a pair of attachment lenses, each retained by a non-magnetic eyewire rim around the periphery of a respective attachment lens and joined by a lens attachment bridge,
      the non-magnetic eyewire rims extending around the periphery of each lens also extending in the direction of a respective magnetic eyewire rim,
      each non-magnetic rim having a plurality of individual magnets fastened in positions adjacent the surface of each attachment lens and adjacent the inner periphery of the part of the non-magnetic eyewire rim extending around the periphery of the respective lens that extends in the direction of a respective magnetic eyewire rim;
      each non-magnetic eyewire rim having the same shape as a respective magnetic eyewire rim, and having a size slightly larger than the respective magnetic rim to dispose the magnets against the face and not the periphery of the magnetic rims when the lens attachment is positioned in front of and in close proximity to the spectacles.

26. The eyeglass combination of claim 25 wherein the magnets do not extend beyond the edge of the part of the non-magnetic eyewire rims that extend in the direction of a respective magnetic eyewire rim.

27. The eyeglass combination of claim 25 wherein the magnets extend to the edge of the part of the non-magnetic eyewire rim that extends in the direction of a respective magnetic eyewire rim.

28. The eyeglass combination of claim 25 wherein the part of the non-magnetic eyewire rim that extends in the direction of a respective magnetic eyewire rim extends beyond the respective edge of the magnets.

29. The eyeglass combination of claim 28 wherein the part of each non-magnetic eyewire rim that extends beyond the respective edge of the magnets slips over the outer periphery of a respective magnetic eyewire rim.

30. The eyeglass combination of claim 25 wherein the magnets are rectangular, rare earth magnets.

31. The eyeglass combination of claim 25 wherein the inner periphery of the eyewires of the lens attachment extends over the outside of said spectacle lenses for at least a part of the periphery of the spectacle lenses, thereby reducing light leakage.

32. The eyeglass combination of claim 25 wherein the lens attachment bridge extends over and hooks behind the spectacle bridge.

33. The eyeglass combination of claim 25 wherein the eyewires of the lens attachment have notches at positions corresponding to one or both of the locations of the bridge and the endpieces.

34. A lens attachment for spectacles having a pair of spectacle lenses, each retained by a magnetic eyewire rim extending at least part way around the periphery of each spectacle lens and having a predetermined peripheral outside size and shape, a spectacle bridge connecting the magnetic eyewire rims, a pair of endpieces coupled to adjacent opposite extremes of the magnetic eyewire rims, and a temple member coupled to each endpiece, comprising:

a lens attachment assembly for magnetic attachment to the magnetic eyewire rim of the spectacles, the lens attachment assembly having a pair of attachment lenses, each retained by a non-magnetic eyewire rim extending at least part way around the periphery of a respective attachment lens and joined by a lens attachment bridge, each non-magnetic eyewire rim having a plurality of individual magnets, fastened in positions adjacent the surface of each attachment lens and adjacent an inner periphery of the non-magnetic eyewire rim;

each non-magnetic eyewire rim having the same shape as a respective magnetic eyewire rim to which the lens attachment will attach, and having a size slightly larger than the respective magnetic rim to which it will attach to dispose the magnets against the face and not the periphery of the magnetic rims when the lens attachment is positioned in front of and in close proximity to the spectacles.

35. The lens attachment of claim 34 wherein the magnets do not extend beyond the edge of the non-magnetic eyewire rims.

36. The lens attachment of claim 34 wherein the magnets extend to the edge of the non-magnetic eyewire rims.

37. The lens attachment of claim 34 wherein the part of the non-magnetic eyewire rim extends beyond the respective edge of the magnets.

38. The lens attachment of claim 37 wherein the part of each non-magnetic eyewire rim that extends beyond the respective edge of the magnets slips over the outer periphery of a respective magnetic eyewire rim of the spectacles when placed thereon.

39. The lens attachment of claim 34 wherein the magnets are rectangular, rare earth magnets.

40. The lens attachment of claim 34 wherein the inner periphery of the eyewires of the lens attachment extends over the outside of said spectacle lenses for at least a part of the periphery of the spectacle lenses when placed thereon, thereby reducing light leakage.

41. The lens attachment as recited in claim 34 wherein the lens attachment bridge will extend over and hook behind the spectacle bridge.

42. The lens attachment as recited in claim 34 wherein the eyewires of the lens attactment have notches at positions corresponding to the locations of one or both the bridge and the endpieces of the spectacles.

43. The lens attachment of claim 34 wherein the non-magnetic eyewire rims extend all the way around the periphery of a respective attachment lens.

44. The lens attachment of claim 34 wherein the non-magnetic eyewire rims extend only part way around the periphery of a respective attachment lens.

* * * * *